United States Patent [19]

Hegler et al.

[11] Patent Number: 4,915,425
[45] Date of Patent: Apr. 10, 1990

[54] PIPE CONNECTING ELEMENT

[75] Inventors: Wilhelm Hegler; Ralph-Peter Hegler, both of Goethestrasse 2, D-8730 Bad Kissingen, Fed. Rep. of Germany

[73] Assignee: Wilheim Hegler, Bad Kissingen, Fed. Rep. of Germany

[21] Appl. No.: 259,861

[22] Filed: Oct. 19, 1988

[30] Foreign Application Priority Data

Dec. 30, 1987 [DE] Fed. Rep. of Germany ....... 3744510

[51] Int. Cl.$^4$ .......................................... F16L 43/00
[52] U.S. Cl. .................................... 285/179; 285/903; 285/138; 138/173
[58] Field of Search ................. 285/179, 55, 138, 903, 285/909; 138/173, 109, 121, 122, 148

[56] References Cited

U.S. PATENT DOCUMENTS

| 3,677,676 | 3/1972 | Hegler | 425/504 |
| 3,753,287 | 8/1973 | Ziemek | 285/903 X |
| 3,998,579 | 11/1976 | Nordstrom | 425/393 |
| 4,037,626 | 7/1977 | Roberts | 285/138 X |
| 4,117,201 | 9/1978 | Keifert | 285/179 X |
| 4,145,762 | 2/1979 | Lupke | 285/909 X |
| 4,202,568 | 5/1980 | Strom | 285/903 X |
| 4,232,712 | 11/1980 | Squires | 285/909 X |
| 4,303,104 | 12/1981 | Hegler et al. | 138/173 X |

FOREIGN PATENT DOCUMENTS

| 0672802 | 10/1963 | Canada | 285/138 |
| 0054308 | 2/1967 | German Democratic Rep. | 285/179 |
| 6710101 | 1/1968 | Netherlands | 285/138 |
| 0568516 | 10/1975 | Switzerland | 285/903 |

Primary Examiner—Thomas F. Callaghan
Assistant Examiner—Carol I. Bordas
Attorney, Agent, or Firm—Browdy & Neimark

[57] ABSTRACT

A pipe connecting element serves to connect pipes, which consist essentially of a continuous inner pipe and connected with it, extending radially outwards, projections, which serve to stiffen the pipe. To make such a pipe connecting element suitable to the light construction concept of double walled pipes or corrugated pipes on the one hand and achieve high load capacity in the direction of the pipe axis and good hydraulic properties on the other, the pipe connecting element consists of connected with each other sections, which are constructed by a core pipe and a jacket pipe. Adjacent sections are connected on their butt joint surfaces in such a manner that the core pipes and the jacket pipes each of these adjacent sections are connected with each other. Additionally, the core pipe and the jacket pipe of each section are firmly connected with each other.

12 Claims, 4 Drawing Sheets

4,915,425

PIPE CONNECTING ELEMENT

FIELD OF THE INVENTION

The invention relates to a pipe connecting element, particularly angle piece or bifurcating piece, to connect pipes which consist essentially of a continuous inner pipe and projections connected with it which extend radially outwards and serve for the stiffening of the pipe, particularly for the connection of double walled pipes or corrugated pipes.

BACKGROUND OF THE INVENTION

Usually pipe connecting elements for compound and corrugated pipes are manufactured by injection molding. By pipe connecting elements, what is meant is bifurcations or branches, bends or angles as well as insertion sockets. Such pipe connecting elements, produced by injection molding, due to their inherent concept, do not represent the principle of light construction, a distinguishing feature of double walled pipes or compound pipes and corrugated pipes. Moreover, the cost of injection molding tools is extremely high.

It is known to manufacture pipe connecting elements for simple corrugated pipes from calibrated pipes or hollow sections, whose inner cross-section fits the outer cross-section of the to-be-connected pipe. These pipe connecting elements are manufactured from several sections, which are joined with each other on their butt joint surfaces by fusion, adhesion or the like.

SUMMARY OF THE INVENTION

It is an object of the invention to create pipe connecting elements of the generic type, which are suitable to the light construction concept of double walled pipes or corrugated pipes and at the same time have high load capacity in the direction of the pipe axis as well as good hydraulic properties.

This object is achieved in accordance with the invention in that the pipe connecting element consists of connected with each other sections, which are formed by a core pipe with outwardly extending radial projections and a jacket pipe, that the adjacent sections are connected on their butt joint surfaces in such a manner that the core pipes and the jacket pipes each of these adjacent sections are connected with each other, and that the core pipe and the jacket pipe of each section are firmly connected with each other. There are no free spaces inside the pipe connecting element, as on the butt joint surfaces of the individual sections the core pipes on one hand and the jacket pipes on the other are joined with each other. As the core pipes have a very slight wall thickness, their contribution to the load capacity in the direction of the pipe axis is very small. Therefore, the transfer of force (tensile, compression, bending load and the like) between the sections takes place primarily through the jacket pipe. The pipe connecting elements have therefore good mechanical properties with slight raw material usage. The mechanical requirements placed on the pipe system, i.e. on the to-be-joined with each other pipes by means of the pipe connecting elements, are also fulfilled by these elements. As there are no free spaces formed in the pipe connecting elements, they exhibit optimum hydraulic properties. Critical positions for solid material deposits, which may cause blockages, are not present. The arrangements according to the invention make feasible, if necessary, a watertight connection between the to-be-connected pipes and the pipe connecting elements. The manufacture of the pipe connecting elements is exceptionally cost effective, as the avoidance of expensive injection molding is exceptionally cost effective because no expensive injection molding tools are required. As the core pipes are identical with the adjoining pipes, only the jacket pipes have to be manufactured separately. By this a high flexibility can be achieved in the development of the pipe connecting elements without additional expenses.

The jacket pipe thus can serve the function of a carrier pipe, i.e. provide the function of giving stability or strength to the combination of core pipe and jacket pipe.

Further advantages and features of the invention result from the following description of embodiments taken in conjunction with the drawings.

DESCRIPTION OF THE PREFERRED EMBODIMENTS

In FIGS. 1 to 4 some pipe connecting elements are illustrated as examples only. All pipe connecting elements consist of several sections 1 to 9, which are connected watertight and with great strength at their butt joint surfaces 10 to 15', as a rule fused or adhered. The individual sections 1 to 9 and with it also all pipe connecting elements consist in their basic construction of one core pipe 16 and a jacket pipe 17 each.

Figure 1:
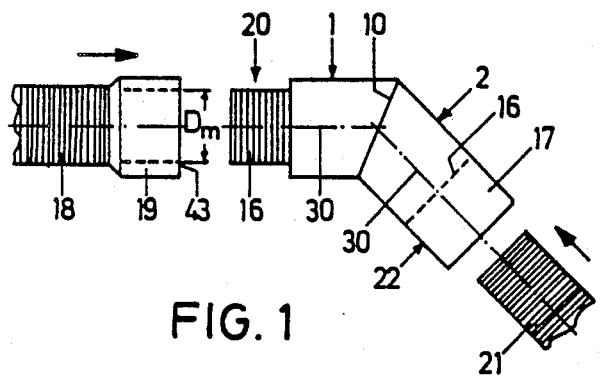
FIG. 1 shows a pipe connecting element in the shape of an angular piece.
Figure 2:
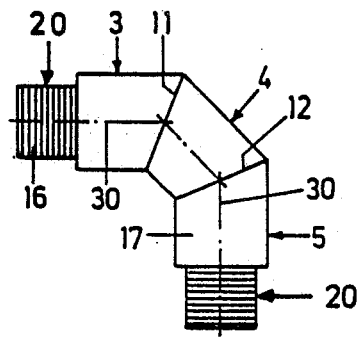
FIG. 2 shows a pipe connecting element in the shape of another angular piece.
Figure 3:
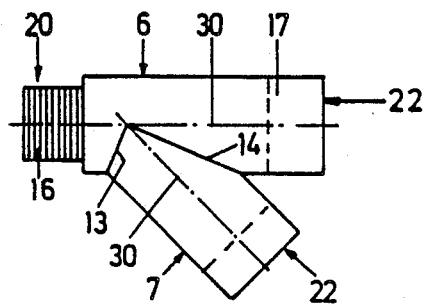
FIG. 3 shows a pipe connecting element in shape of a bifurcating piece.

Normally the core pipe 16 is identical with the pipes which are to be connected with each other with the respective pipe connecting element. This is indicated in FIG. 1. Pipe 18 at the left has a socket 19, which is to pushed over the protruding core pipe 16 allocated to section 1 and by this connected with the pipe connecting element. When the core pipe 16 protrudes from the jacket pipe 17 for introduction into a socket 19, one speaks about a spigot 20. From below right a pipe 21 is pushed into the section 2, which is provided in this region with a socket end 22, i.e. the core pipe 16 situated in this section 2 terminates clearly before the end face of this section 2, so that pipe 21 not provided with a socket on this corresponding end can be pushed into this socket end 22. As pipe connecting elements 45° angles (FIG. 1), 90° angles (FIG. 2), 45° branches or 45° distributors (FIG. 3) or 90° branches or T-pieces (FIG. 4) are feasible. Numerous further embodiments are known to originate from the basic form, which can be realised in manners yet to be described.

In the following embodiments of FIGS. 5–10, the core pipe 16 will be described, as a matter of fact in the form of double-walled and compound pipes. They each consist of a continuous cylindrical inner pipe 23 and a corrugated outer pipe 24. The manufacture of these pipes is carried out in a manner known from U.S. Pat. No. 3,677,676, where the connection between the inner pipe 23 and the outer pipe 24 takes place when the thermoplastic hoses from synthetic material, forming the inner pipe 23 and the outer pipe 24, are joined subsequently behind the molding head of the extruder. In the region of two adjacent circular rings 25 of the outer pipe 24, i.e. in the region of a corrugation valley 26, the inner pipe 23 and the outer pipe 24 are integral.

As can be seen from the drawing, each circular ring 25 has the cross-section of an outwardly slightly tapering trapezium, where this trapezium cross-section is limited on the outside by a cylindrical outer wall section 27 and laterally by two side wall sections 28, 29, which are, relative to the longitudinal central axis 30, inclined radially outwards next to each other. The base of the trapezium is formed by the respective inner pipe 23.

Figure 5:
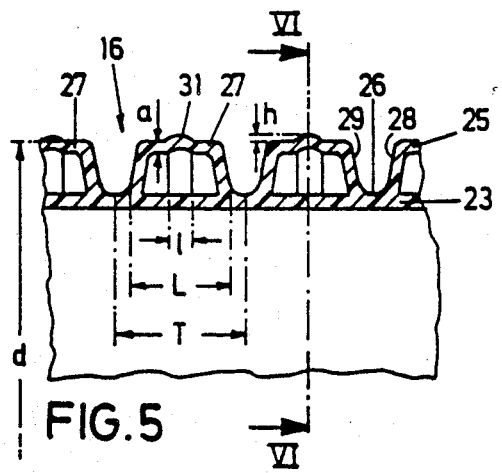
FIG. 5 is a partial longitudinal section through a core pipe.
Figure 6:
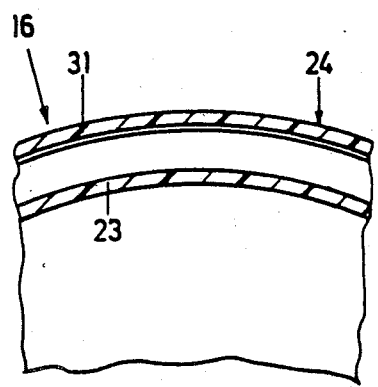
FIG. 6 is a partial cross-section through the core pipe shown in FIG. 5, corresponding to section line VI—VI of FIG. 5.

In the embodiment shown in FIGS. 5 and 6, each outer wall section 27 is provided with an annular, continuous flat protuberance 31, which is formed from the outer wall section 27, therefore has the same approximate thickness a as the outer wall section 27 and the side wall sections 28, 29. The extent of the annular protuberance 31 in the direction of the axis 30 is l. The extent of the circular ring 25 in the direction of the axis 30 is L. This dimension L is less than the pitch T of the circular rings 25 of the respective pipe, which is represents the distance of the centers of two adjacent corrugation valleys 26. The annular protuberances 31 extend past the cylindrical outer wall sections 27 by the radial dimension of h. The outside diameter of the outer wall section 27 is designated with d.

Figure 7:
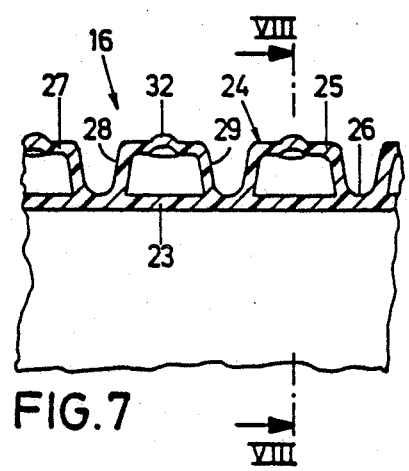
FIG. 7 is a partial longitudinal section through a core pipe of a modified design.
Figure 8:
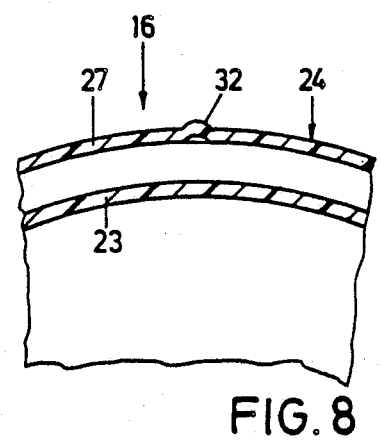
FIG. 8 is a partial cross-section through the core pipe shown in FIG. 7, corresponding to section line VIII—VIII of FIG. 7.

As can be seen from FIGS. 7 and 8, the double-walled pipe can be modified in comparison with FIGS. 5 and 6 in such a manner, that instead of a continuous annular protuberance 31 a burl-like protuberance 32 is formed on the outer wall section 27. As otherwise the pipe is unchanged, the same reference symbols are used. This is valid for the dimension designations too.

Figure 9:
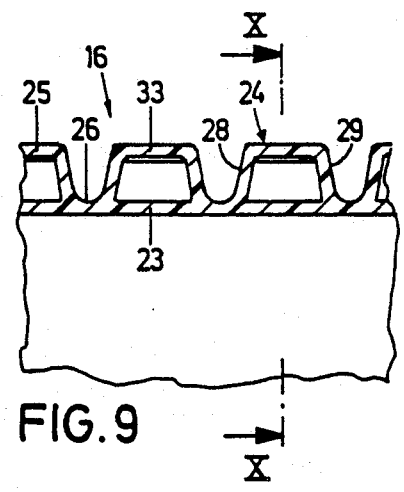
FIG. 9 is a partial longitudinal section through a core pipe of a further modified embodiment.
Figure 10:
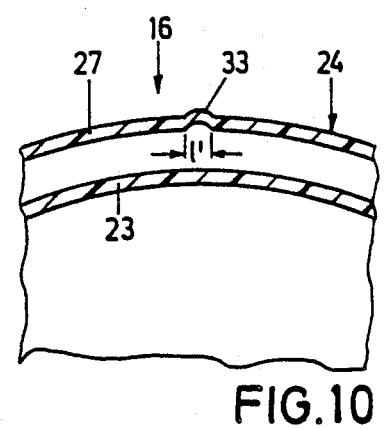
FIG. 10 is a partial cross-section through the core pipe shown in FIG. 9, corresponding to section line X—X of FIG. 9.

Furthermore, it is obvious from FIGS. 9 and 10 that, in case of an otherwise identical embodiment, on the cylindrical outer wall sections 27 linear axial protuberances 33 are formed which extend parallel to the axis 30.

Here, too, the same reference numbers and dimentional designations are used. The double-walled pipes of the basic design of FIGS. 5 to 10, especially with the annular continuous protuberances 31 of FIGS. 5 and 6, are known from German published patent application Ser. No. 36 03 481 corresponding to U.S. patent application Ser. No. 008,584.

Figure 11:
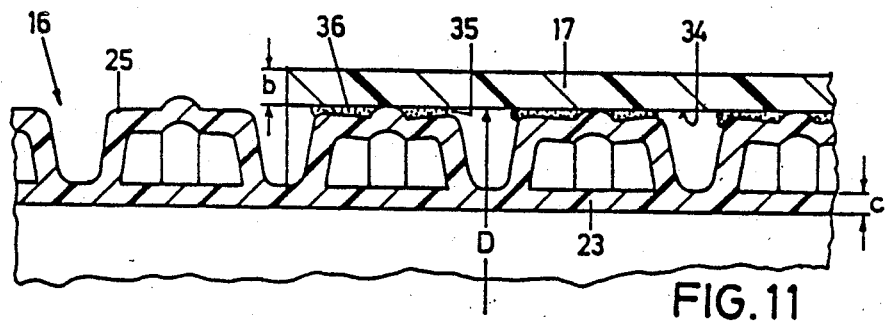
FIG. 11 shows a joint between the core pipe and the jacket pipe by adhesion.
Figure 12:
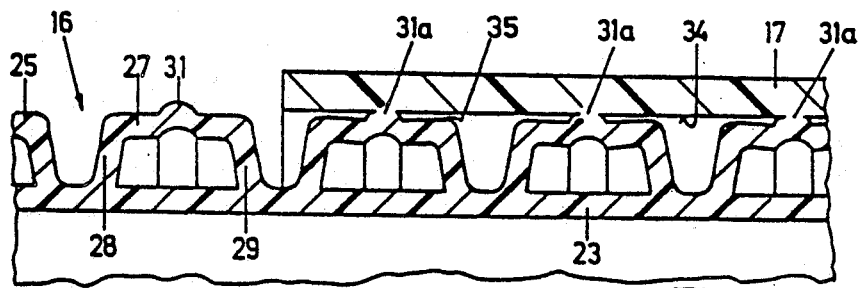
FIG. 12 shows a joint of the core pipe and the jacket pipe by fusion.
Figure 13:
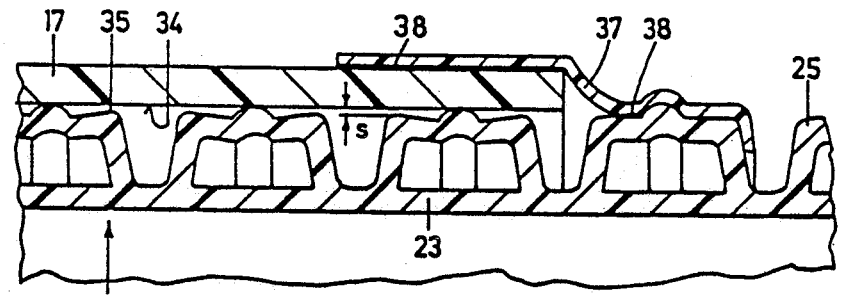
FIG. 13 shows a joint between the core pipe and the jacket pipe by means of a shrink hose.

In FIGS. 11 to 13 the various possibilities of connections between the core-pipe 16 and the jacket pipe 17 are illustrated, while the core pipe 16 is chosen in accordance with the one of FIGS. 5 and 6.

The respective jacket pipe 17 has a wall thickness b, which is obviously larger than the wall thickness c of the inner pipe 23. $b > 1.5\,c$ is valid. As upper limit $b < 5\,c$ is valid. $b \approx 2\,c$ is preferred.

For the inside diameter D of the jacket pipe 17 the following is valid relative to the corresponding dimensions of the jacket pipe 16: $d < D < d + 2\,h$. In other words, because of such corresponding dimensions and the resulting pre-tensioning created thereby, when pushing in the core pipe 16 into the jacket pipe 17, the annular protuberances 31 (or the burl-like protuberances 32 or the linear axial protuberances 33) are pressed positively against the inner wall 34 of the jacket pipe 17, while at the same time the circular rings 25 are deformed in such a manner that the cylindrical outer wall sections 27 are pressed through radially inwards.

On the other hand, the outer wall sections 27 (with the exception of protuberances 31, 32 or 33) do not come into contact yet with the inner wall 34 of the jacket pipe 17. The jacket 17 and the core pipe 16 are, however, radially braced relative each other. Between the inner wall 34 and the outer wall sections 27 roughly cylindrical gaps 35 are formed, whose height s is smaller than the height h of the protuberances 31 or 32 or 33. The direct contact between the core pipe 16 and the jacket pipe 17 is therefore only spot-like (when using burl-like protuberances 32) or linear (when using the annular protuberances 31 or the linear axial protuberances 33).

As can be seen from FIG. 11, a rigid connection between the core pipe 16 and the jacket pipe 17 can be established so, that the cylindrical gap 35 is filled with an adhesive layer 36. This adhesive layer 36 can be applied to the cylindrical outer wall sections 27 of the core pipe 16 before the insertion of the core pipe 16 into the jacket pipe 17. This adhesive layer 36 can, however, be established by applying it to the inner wall 34 of the jacket pipe 17 before the insertion of the core pipe 16 into the jacket pipe 17. The latter mentioned method has advantages as far as the assembly is concerned. In this case it is possible that the adhesive layer 36 does not form on every outer wall section 27 which, however, has no influence on the sealing and the strength of the connection between the core pipe 16 and the jacket pipe 17. As the height of the gap s is in the range of 0.1 to 0.2 mm, the adhesive layer 36 is sufficiently thin, and accordingly a good adhesive connection is ensured.

In case of the embodiment according to FIG. 12, the protuberances 31 are fused to the inner wall 34 of the jacket pipe 17. The protuberances 31 are deformed or flattened during the fusion process by forming fusion areas 31a, so that the radial deformation of the outer wall sections 27 during the insertion of the core pipe 16 into the jacket pipe 17 is partially cancelled.

In case of the development according to FIG. 13, the connection between the core pipe 16 and the jacket pipe 17 takes place by means of a shrink hose 37, which can be used only if the pipe connecting element has a spigot 20. In this case the shrink hose 37 is pushed over the end of the jacket pipe 17 and the protruding from the jacket pipe 17 portion of the core pipe 16 and shrunk in the usual manner by an appropriate heat treatment. In this process it is fixed to the outer circumference of the jacket pipe 17 and over the circular ring 25 of the core pipe 16 which is adjacent to the jacket pipe 17, whose outer profile it fits, which also creates a rigid axial connection between the shrink hose 37 and the core pipe 16. Simultaneously, an adhesive layer 38, situated on the inside of the shrink hose 37 is activated, by which an additional securing as well as a watertight connection is achieved due to the adhesion between the shrink hose 37 and the core pipe 16 and the jacket pipe 17, respectively. Such shrink hose, which have an adhesive layer capable of being heat activated, are commercially available.

Figure 4:
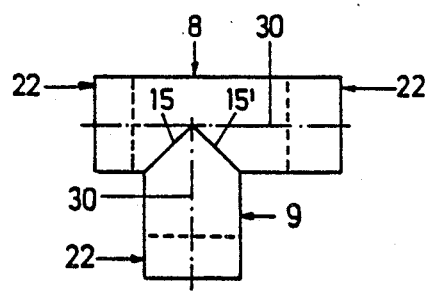
FIG. 4 shows a pipe connecting element in the shape of another pipe-bifurcating piece.
Figure 14:
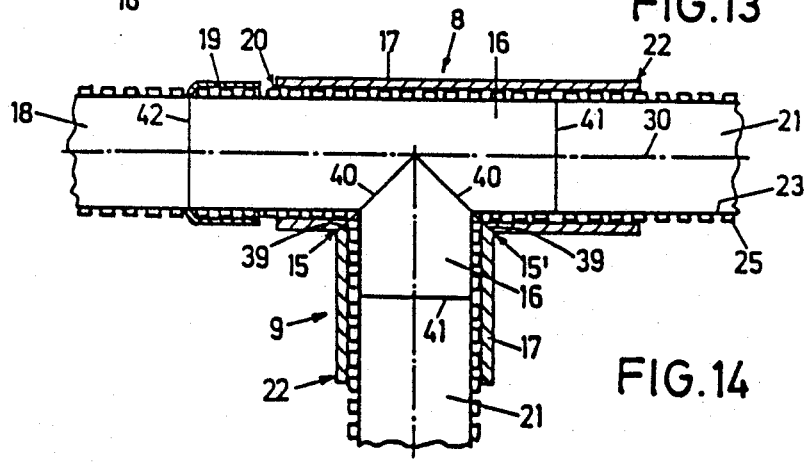
FIG. 14 shows a pipe connecting element in the shape of a T-piece with a partially broken illustration.

FIG. 14 shows a pipe connecting element in the form of a 90° branch or T-piece, which corresponds to the illustration in FIG. 4; for this reason identical reference symbols are used. It can be recognised that the jacket pipes 17 of section 8 and of section 9 are connected with each other in the region of the butt joint surfaces 15 and 15', respectively, by adhesive or fused joint 39. Correspondingly, it can be seen that the core pipes 16 in this region are connected with each other by means of adhesive or fused joints 40. Furthermore, it can be recognised that the pipe 21 inserted in the socket ends 22 abuts tightly against the core pipe 16 on an abutting surface 41. In a similar fashion, the core pipe 16 abuts at the spigot end 20 in the socket 19 of pipe 18 tightly against a butt joint surface 42 of pipe 18, so that in the region of each butt joint surfaces 41, 42 a connection without free spaces is ensured.

In all previously described cases the jacket pipe 17 is constructed in the shape of a calibrated circular cylinder, while the manufacture of such calibrated pipes is carried out in the usual manner. For a pipe connecting element for pipes 18, 21 with a nominal size of 100 mm the following dimension are valid:

$d \approx 110$ mm
$T \approx 12$ mm
$l \approx 2.0$ mm
$h \approx 3.0$ mm
$a \approx 0.5$–0.6 mm
$L \approx 10$ mm Generally the following relations are valid:
For the radial extension h of the protuberances 31, 32, 33, relative to the outside diameter d
$0.002\ d \leq h \leq 0.004\ d$ is valid.

For the axial extension l of the annular protuberances 31 and the burl-like protuberances 32 relative to the axial extension L of the circular rings 25
$0.10\ L \leq l \leq 0.35\ L$ is valid.

For the axial extension l of the annular protuberances 31 and the burl-like protuberances 32 relative to the thickness a of the outer wall section 27
$3\ a \leq l \leq 5\ a$ is valid.

For the tangential width l' of the linear axial protuberances 33 the relations of the previous l are valid.

Figure 15:
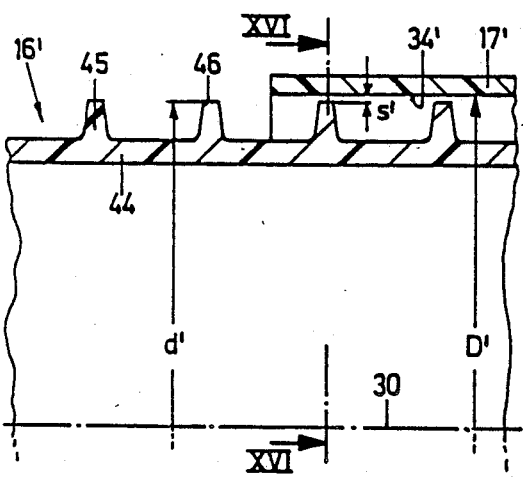
FIG. 15 shows a connection between a core pipe formed as a pipe with fins and a jacket pipe in a partial longitudinal section.
Figure 16:
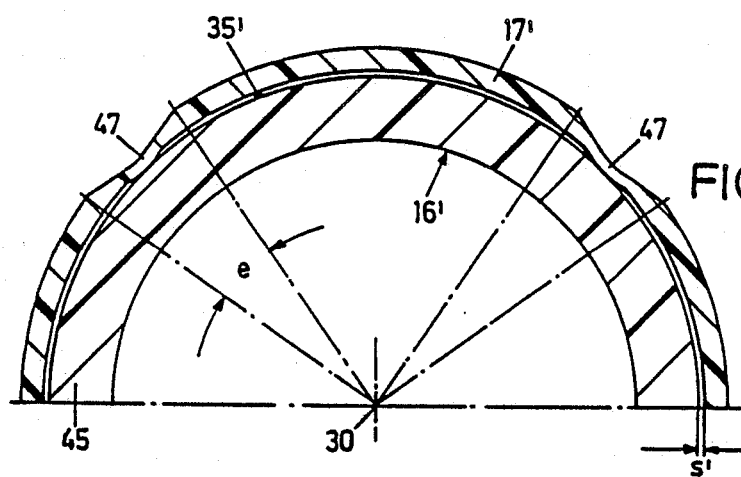
FIG. 16 is a partial cross-section through FIG. 15 according to section line XVI—XVI of FIG. 15.
Figure 17:
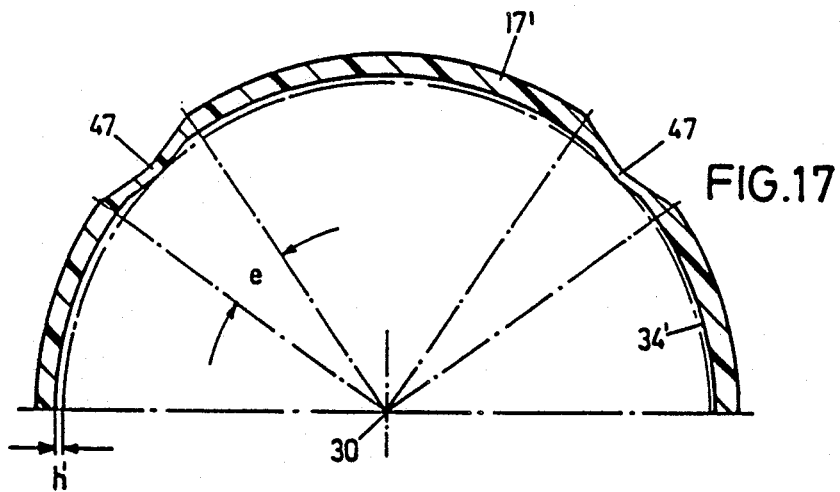
FIG. 17 is a partial cross-section through the jacket pipe of FIG. 15 without an inserted core pipe.

Basically it is correct that the inside diameter Dm of the socket 19 of pipe 18 equals that of the inside diameter D of the jacket pipe 17, while to facilitate the assembly the socket 19 may be slightly widened at its lead-in end 43 (see FIG. 1) in a known manner. Pipe connecting elements of the described type may be developed also for corrugated pipes in accordance with FIGS. 15 to 17, where the core pipe 16' is constructed as a corrugated pipe. Such corrugated pipes are known, for example, from U.S. Pat. No. 3,998,579. Such corrugated pipes have an essentially circular cylindrical pipe wall 44, from whose outer circumference radial fins 45 protrude outwardly, which have an outside diameter d'. The jacket pipe 17' has an inside diameter D', which is slightly larger than the outer diameter d' of the fins 45, so that between its roughly cylindrical outer circumferential surface 46 and the inner wall 34' a gap s' is formed, whose radial height is approximately 0.1 to 0.2 mm.

The jacket pipe 17' is provided with beads running continuously parallel with the longitudinal axis 30, i.e. with inwardly directed protuberances 47, which protrude inwardly by a dimension h', which is slightly greater than the height of the gap s', so that during the insertion of the core pipe 16' into the jacket pipe 17' the fins 45 are radially braced against the axially extending protuberances 47.

$0.002\ D' \leq h' \leq 0.004\ D'$ is valid.

The gaps 35' remaining between the adjacent protuberances can be, as already described, filled with adhesive. In a similar manner a fusion can be carried out between these protuberances 47 and the abutting to this fins 45 or a connection can be achieved by means of a shrink hose.

The protuberances 47 extend tangentially by an angle of the arc e, for which $20° < e < 30°$ is valid.

A rigid connection between the core pipes 16, 16' and the corresponding jacket pipes 17, 17' of each section 1 to 9 is not necessarily by form locking; it can be produced by force locking, for instance by sufficiently strong frictional locking.

What is claimed is:

1. Pipe connecting element, particularly angle piece or bifurcating piece, for connecting pipes which consists essentially of a continuous inner pipe and projections connected with it which extend radially outwards and serve for the stiffening of the pipe, including double walled pipes or corrugated pipes, the pipe connecting element comprising:

at least two sections each formed by a core pipe with outwardly extending radial projections and a jacket pipe, wherein adjacent sections are connected on their butt joint surfaces in such a manner that in the core pipes and the jacket pipes each of these adjacent sections are connected to each other, and wherein the core pipe and the jacket pipe of each section are firmly connected with each other, and wherein one of the two pipes of a section at its free end protrudes past the other pipe.

2. Pipe connecting element according to claim 1, wherein the core pipes are identical with the pipe to be connected with each other.

3. Pipe connecting element according to claim 1, wherein the projections of the core pipe are adhered to the jacket pipe.

4. Pipe connecting element, particularly angle piece or bifurcating piece, for connecting pipes which consist essentially of a continuous inner pipe and projections connected with it which extend radially outwards and serve for the stiffening of the pipe, including double walled pipes or corrugated pipes, the pipe connecting element comprising:

at least two sections, each formed by a core pipe with outwardly extending radial projections and a jacket pipe, wherein adjacent sections are connected on their butt joint surfaces in such a manner that in the core pipes and the jacket pipes each of these adjacent sections are connected to each other, and wherein the core pipe and the jacket pipe of each section are firmly connected with each other, and wherein the projections of the respective core pipe are subjected to elastic radial pretensioning against the associated jacket pipe.

5. Pipe connecting element according to claim 4, wherein between the projections of the corresponding core pipe and the jacket pipe are provided radially extending, elastically flexible protuberances are formed.

6. Pipe connecting element according to claim 5, where the core pipe is constructed as a double walled pipe with said projections being in the form of circular rings which each have the approximate cross-section of an outwardly tapering trapezium and formed by an approximately cylindrical outer wall section and adjoining slightly inclined side wall sections, wherein the outer wall section is provided with said protuberances which can be deformed radially inwards and whose outside diameter in the non-deformed state is slightly greater than the inside diameter of the jacket pipe.

7. Pipe connecting element according to claim 6, wherein the protuberances are ring, burl and axially linear shaped.

8. Pipe connecting element according to claim 5, where the core pipe comprises a finned pipe with said projections comprising radially outwardly protruding fins, wherein the protuberances are formed on the jacket pipe and extend radially inwardly, while the inside diameter in undeformed state is slightly smaller than the outside diameter or the core pipe.

9. Pipe connecting element according to claim 8, wherein the protuberances are formed axially and in a linear shape.

10. Pipe connecting element according to claim 5, wherein the protuberances are fused with the respective abutting surfaces.

11. Pipe connecting element according to claim 4, wherein the projections abut in a spot-like or linear form against the jacket pipe.

12. Pipe connecting element particularly angle piece or bifurcating piece, for connecting pipes which consist essentially of a continuous inner pipe and projections connected with it which extend radially outwards and serve for the stiffening of the pipe, including double walled pipes or corrugated pipes, the pipe connecting element comprising:

at least two sections, each formed by a core pipe with outwardly extending radial projections and a jacket pipe, wherein adjacent sections are connected on their butt joint surfaces in such a manner that in the core pipes and the jacket pipes each of these adjacent sections are connected to each other, and wherein the core pipe and the jacket pipe of each section are firmly connected with each other, and wherein the core pipe and the jacket pipe are joined with each other by means of a shrink hose.

* * * * *